(No Model.)

P. STEELE.
PRESS.

No. 547,042. Patented Oct. 1, 1895.

Witnesses
C. C. Burdine
C. B. Bull

Patterson Steele
Inventor

By Dodge & Sons
Attorneys.

UNITED STATES PATENT OFFICE.

PATTERSON STEELE, OF ELK CHESTER, KENTUCKY.

PRESS.

SPECIFICATION forming part of Letters Patent No. 547,042, dated October 1, 1895.

Application filed June 10, 1895. Serial No. 552,293. (No model.)

*To all whom it may concern:*

Be it known that I, PATTERSON STEELE, a citizen of the United States, residing at Elk Chester, in the county of Fayette and State of Kentucky, have invented certain new and useful Improvements in Presses, of which the following is a specification.

My invention relates to screw-presses, and has reference more particularly to that class of presses in which the nut, which is rotated, is held in suitable bearings in the frame and receives a screw which is prevented from turning within the nut.

Figure 1:
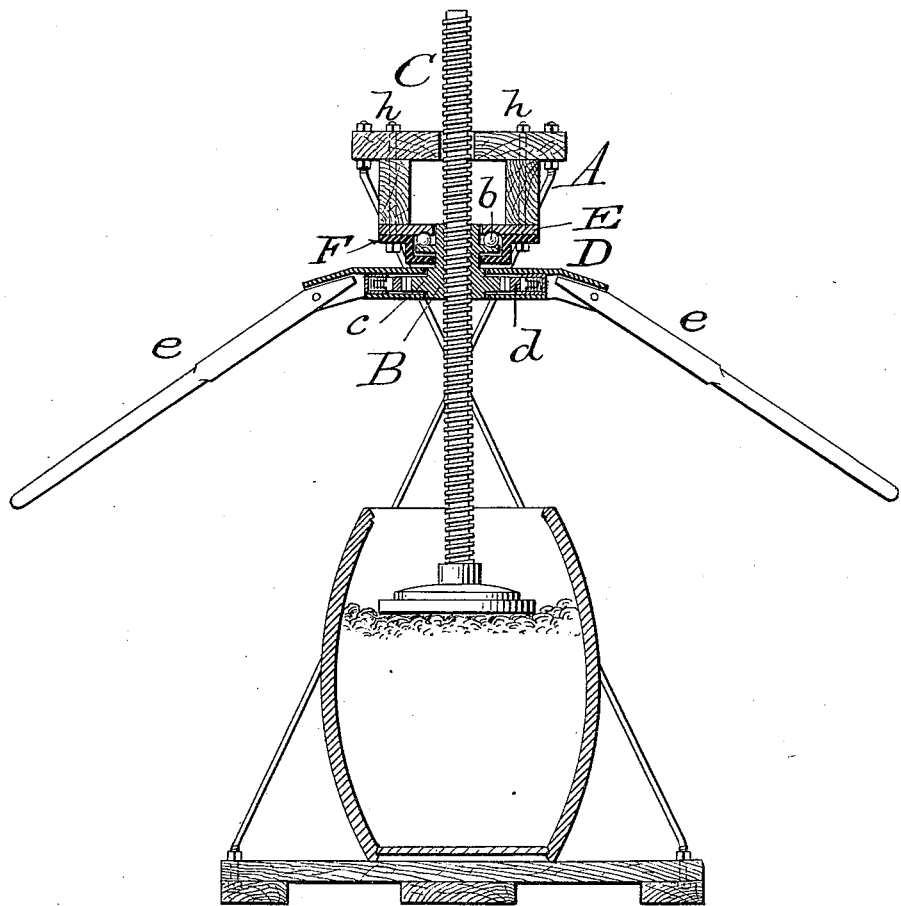
Figure 1:
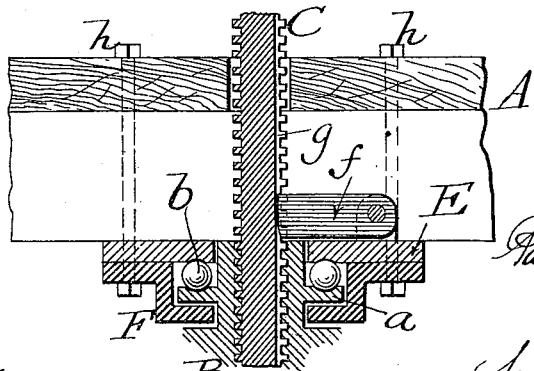

In the drawings, Figure 1 is a vertical sectional view through my press; and Fig. 2, a sectional view, on a larger scale, of a part of the nut and screw.

In the drawings, A is a frame, which may be of any suitable construction; B, the nut carried thereby, and C the screw. The nut B is provided with a lateral flange $a$, which is grooved on its upper face to form a channel or bearing for the balls $b$, and is further provided with a ratchet-wheel $c$, to which motion is imparted by a rotatable frame D, carrying pawls $d$ and levers $e$. Any other means may obviously be employed to turn or rotate the nut.

E indicates a plate having a central aperture to receive the upper reduced end of the nut, and provided on its under side with a groove or channel to receive the balls $b$. This plate E, which is designed to be bolted to the under side of the top beams of the frame, is provided on its upper face with lugs or ears, to which is pivoted a latch $f$, (see Fig. 2,) which latch is designed to enter the groove $g$ in the screw, and thereby prevent rotation of the latter.

F indicates a ring or collar made in two or more parts and arranged to engage a groove in the nut, as shown, and thereby hold and prevent the nut from dropping down away from the frame. The ring F is held in position by bolts $h$, which are preferably used to retain the plate in position. If desired, separate bolts or screws may be employed to hold the plate in position before the ring is applied. By having the latch $f$ free at one end it can readily find its way into the groove in the screw when the latter is first entered into the nut.

Having thus described my invention, what I claim is—

In a press, the combination with a main frame; of a slotted screw; a nut B provided with a flange $a$; a plate E provided on its upper face with a latch $f$ to engage the screw; balls $b$ interposed between the flange $a$ and the plate E; and a ring or collar F secured to the main frame and engaging the under side of the flange $a$; substantially as shown and described.

In witness whereof I hereunto set my hand in the presence of two witnesses.

PATTERSON STEELE.

Witnesses:
H. G. SMITHA,
FAUST FONSHEE.